Nov. 22, 1966  A. H. B. WALKER  3,287,662
SELF-EXCITED CHOPPER CIRCUIT UTILIZING CONTROLLED
RECTIFIER HAVING A GATE TURN-OFF
CHARACTERISTIC
Filed Feb. 21, 1963

WITNESSES:
John L. Clopp
James F. Young

INVENTOR
Alec H. B. Walker
BY
Francis E. Blake
ATTORNEY 3,287,662
SELF-EXCITED CHOPPER CIRCUIT UTILIZING CONTROLLED RECTIFIER HAVING A GATE TURN-OFF CHARACTERISTIC
Alec H. B. Walker, Trafford, Pa., assignor to Westinghouse Electric Corporation, Pittsburgh, Pa., a corporation of Pennsylvania
Filed Feb. 21, 1963, Ser. No. 260,159
4 Claims. (Cl. 331—111)

The present invention relates to self-excited chopper circuits for interrupting a current source with controllable frequency and duty cycle.

In the copending patent application Serial No. 143,354, filed October 6, 1961, in the name of Thorndike C. T. New, now Patent No. 3,210,563 and assigned to the same assignee as the subject application, there is described a solid-state controlled rectifier device which may also be termed a four-layer, three-element switch and which may be controlled to be turned on to be fully conductive upon a flow of control current out of its control electrode junction and to be turned off upon a flow of control current into its control electrode junction. Such a device having the aforementioned turn-off characteristics, although physically small, can be used to control the flow of comparatively large electric currents through a load. Another device having similar characteristics is shown in U.S. Patent 2,993,154, issued July 18, 1961.

It is a primary object of the present invention to provide a chopper circuit employing a solid-state controlled rectifier having turn-off characteristics such that the chopper circuit is self-excited and extremely simple and reliable.

Another object of the present invention is to provide a self-excited chopper circuit that is both simple and reliable, yet will control large amounts of electric current.

Still another object of the present invention is to provide a simplified self-excited chopper circuit that may be adjustable to variably predetermine either or both of the frequency or the duty cycle of the current interruptions.

In accordance with the invention, the applied current to be interrupted is applied to a series circuit including a load and the anode and cathode electrodes of a solid-state controlled rectifier having turn-off characteristics as described above. In addition, a control signal resistor is series connected with one of its terminals connected to the cathode electrode and the other of its terminals to a terminal of the applied current source so that the current through the load and controlled rectifier also passes through the control signal resistor. A variable source of control voltage is provided with one of its terminals connected to the control electrode of the solid-state controlled rectifier device and its other terminal connected to the other terminal of the control resistor that is not directly connected to the cathode electrode of the rectifier device. The value of the control resistor is chosen such as to produce a voltage drop thereacross, when the current through the load and controlled rectifier is flowing, in an amount that will exceed the maximum potential of the source of control voltage so that when the controlled rectifier is conductive, the voltage developed across the control resistor will oppose the control voltage and will cause a current to flow into the control electrode of the rectifier to turn it off and cause it to be non-conductive. After the controlled rectifier is thereby turned off, there is no resultant voltage drop across the control resistor and therefore the voltage from the control voltage source will then cause a current to flow out of the control electrode and again turn on the controlled rectifier. A feature of the invention is the provision of a reactance in the control electrode and cathode circuit of the controlled rectifier device to delay both the build-up of flow of current into and flow of current out of the control electrode so as to make the chopper circuit self-excited and to predetermine both the frequency and duty cycle of the interruptions of flow of current through the load and controlled rectifier device.

Further objects, features and the attendant advantages of the invention will be apparent with reference to the following specification and drawings, in which.

Figure 1:
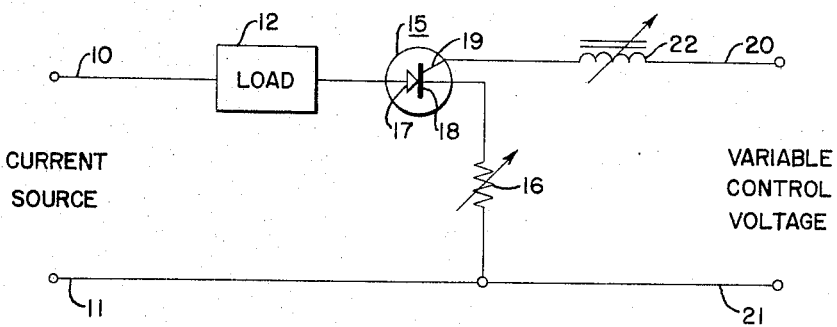
FIGURE 1 is a schematic diagram of one circuit embodiment of the invention.

Referring now to FIG. 1 of the drawing, the current source to be interrupted (not shown) is connected to terminals 10 and 11 which are connected in series with the load 12, the controllable rectifier device 15 and the control signal resistor 16. The controllable rectifier device 15 is of the type having so-called turn-off characteristics as described in the aforementioned patent application Serial No. 143,354. The rectifier device 15 has an anode electrode 17, a cathode electrode 18 and a control electrode 19. It will be seen that the anode electrode 17 is connected to one terminal of the load 12 while the cathode electrode 18 is connected to one terminal of the control signal resistor 16 whose other terminal is connected to the other terminal 11 of the current source. A variable control voltage (not shown) is connected to the terminals 20 and 21, the terminal 21 also being connected to terminal 11 of the current source to be interrupted. Terminal 20 of the variable control voltage source is connected in series with an inductive reactance 22 to the control electrode 19 of the controllable rectifier device 15. Thus, the variable control voltage source as connected to terminals 20 and 21 is connected in the control electrode and cathode circuit of the controlling rectifier device 15 and the reactance 22 is also connected in said circuit. Either or both of the control signal resistor 16 or the inductive reactance 22 may be made variable as is also the case of the amplitude for the control voltage connected to the terminals 20 and 21 in order to adjustably predetermine the frequency and duty cycle of the interruptions of the current through the load 12 as will be more fully described hereinafter. The value of the adjustable resistance 16 is chosen, however, to be such as to produce a voltage drop thereacross that will be at least greater than the maximum potential of the variable control voltage applied to the terminals 20 and 21, also as will be more fully understood from the following description of the operation of the circuit.

It should be first understood that both the current source to be interrupted as connected to terminals 10 and 11 and the variable control voltage connected to terminals 20 and 21 may be either an alternating current or a direct current source. If alternating currents are used, then the chopping actions of the circuit to be described will take place during certain polarity phases only of the alternating current sources as should be understood by those skilled in the art. If direct current sources are employed, then they should be poled such that the positive terminal of the current source to be interrupted is connected to the terminal 10 and hence the anode 17 of the controlled rectifier 15 while the positive terminal of the variable control voltage source is connected to terminal 20 and hence the control electrode 19 of the controllable rectifier device 15. Assuming now that direct current sources are employed, the connection of the positive terminal of the variable control voltage to the control electrode 19 will cause a flow of current out of the control electrode 19 and thus turn on the controlled rectifier device 15 to cause current to flow in the circuit from the terminal 10 through the load 12 and the controlled rectifier device 15 and control resistor 16 to the terminal 11. The flow of current through the control resistor 16 produces a voltage drop thereacross which tends to cause a flow of current back into the control electrode 19 to thereupon turn off the controlled rectifier device 15. However, the flow of current back into the control electrode 19 is delayed by the inductive reactance of the reactance 22 so that the controlled rectifier device 15 remains conductive for a period of time equivalent to the delay provided by the inductive reactor 22. After the delay, sufficient current flows into the control electrode 19 to turn off the control rectifier device 15, thus interrupting the flow of current through the load 12 and the control resistor 16 so that there is again no voltage drop across the control resistor 16. Thereupon the voltage from the variable control voltage source applied to terminals 20 and 21 now tends to cause a current to flow out of the control electrode 19, but the reactance of the inductive reactor 22 again delays the build-up of flow of such current for a period of time during which the flow of current through the load 12 is interrupted. After the delay provided by the inductive reactance 21, current again flows out of the control electrode 19 to turn on the controlled rectifier device 15 which permits current to flow in the load circuit from terminals 10 and 11 and the current source through the load 12, the controlled rectifier device 15, and again the control signal resistor 16. Thus current interruptions or chopping action is continuously obtained in a self-excited manner. By adjusting the values of either or both the control resistor 16 or the inductive reactance 22 or the amplitude of the control voltage applied to terminals 20 and 21, both the frequency and the duty cycle of the interruptions of current flow through the load 12 may be adjustably predetermined. Thus, in one useful application of the chopper circuit of the invention the average current through the load 12 may be controlled by adjusting either the resistor 16, the inductance 22 or the amplitude of the variable control voltage applied to terminals 20 and 21.

Figure 2:
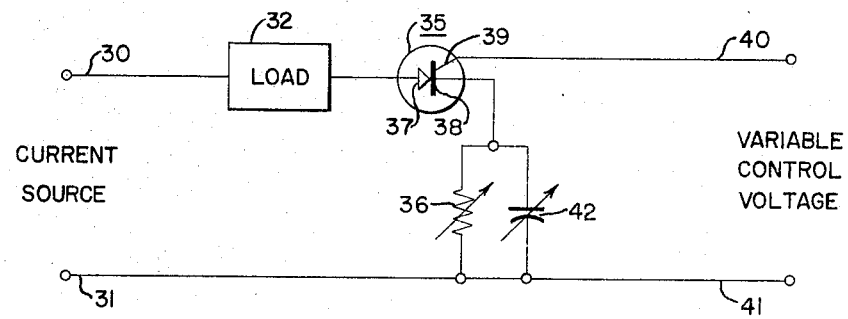
FIG. 2 is a circuit diagram of another embodiment of the invention.

A modified form of the invention is shown by FIG. 2 of the drawings in which a capacitive reactance 42 is used in place of the inductive reactance 22 as shown in the circuit of FIG. 1. The current source to be interrupted is connected to terminals 30 and 31 in series with the load 32 and the controlled rectifying device 35 and control signal resistor 36. The anode 37 of the controled rectifier device is connected to one terminal of the load 32 while the cathode electrode 38 is connected to one terminal of the control signal resistor 36 whose other terminal is connected to the terminal 31 of the current source to be interrupted. If the current source to be interrupted is a direct current source, its positive terminal will be connected to terminal 30 while its negative terminal will be connected to terminal 31. The variable control voltage is connected to terminals 40 and 41, and if such control voltage is of the direct current type, its positive terminal will be connected to terminal 40 and thereby to the control electrode 39 of the controllable rectifier device 35, while its negative terminal which is connected to terminal 41 will also be connected to the negative terminal 31 of the current source. In this form of the invention, the capacitive reactance 42 is connected in parallel with the control signal resistor 36 in the control electrode and cathode circuit of the controllable rectifier device 35. The operation of this circuit is basically the same as that described for the circuit of FIG. 1 except that the variable capacitor 42 delays the flow of current into the control electrode 39 while it is charging and delays the flow of current out of the control electrode 39 while it is discharging through resistor 36. Obviously, by varying either the resistor 36, the capacitor 42 or the amplitude of the variable control voltage applied to terminals 40 and 41, both the frequency and the duty cycle of the interruptions of flow of current through the load 32 may be controlled.

The circuit arrangement of FIG. 2 has been found capable of variably controlling the flow of current through a load 32 from a 200 volt direct current supply to be in the range of 20 to 200 milliamperes for a load impedance of 600 ohms. The control voltage applied to the terminals 40 and 41 was provided with an amplitude range of 1 to 10 volts while the value of the control signal resistor 36 was fixed at 100 ohms and the value of the capacitive reactance 42 was fixed at .1 mfd. The controlled rectifier device 35 was an experimental model type 240 obtainable from the Westinghouse Electric Company at its Youngwood, Pennsylvania plant. When the amplitude of the control voltage applied to terminals 40 and 41 was 1 volt, the chopping frequency for interrupting the current through the load 32 was found to be approximately 1000 cycles per second and the duty cycle was such as to provide for the average flow of 20 milliamperes of current through the load 32. When the amplitude of the variable control voltage applied to terminals 40 and 41 is 10 volts, the chopping frequency for the current through the load 32 was approximately 2000 cycles per second and the duty cycle was such that the average flow of current through the load 32 was about 200 milliamperes. By adjusting the variable control voltage between 1 and 10 volts, the average current through the load 32 and the chopping frequency is continuously adjustable between 20 and 200 milliamperes and 1000 to 2000 cycles per second, respectively.

Although two specific circuit arrangements have been described, it should be understood that the claims are not limited to such specific arrangements since other circuit variations will occur to those skilled in the art within the scope of the claims. Also, although values have been given for one operative circuit arrangement of the invention, it should be obvious that such values are arbitrary only and are dependent entirely upon the relative parameters of the circuit and elements used. Furthermore, it is believed that the operation of the invention when used with alternating current sources in place of direct current sources would be obvious to those skilled in the art and, therefore, not detailed description of such alternating current operation is herein required.

I claim as my invention:

1. A self-excited current chopper for interrupting the flow of current from a current source through a load with a controlled duty cycle comprising, a controllable rectifying device of the type having anode, cathode and control electrodes and capable of being caused to be fully conductive upon flow of current from the control electrode to the cathode electrode and to be fully non-conductive upon flow of current into the control electrode from the cathode electrode, said load connected in the anode-cathode circuit of said device and to said current source, means connecting the cathode electrode of said device and said source of current, a source of control voltage operatively connected to the control electrode of said device, and reactance means connected in the control-cathode circuit of said device to delay the flow of current from said control electrode to said cathode electrode when said device is non-conductive and to delay the flow of current to said control electrode from said cathode electrode when said device is conductive.

2. A self-excited current chopper for interrupting the flow of current from a current source through a load with a controlled duty cycle comprising, a controllable rectifying device of the type having anode, cathode and control electrodes and capable of being caused to be fully conductive upon flow of current from the control electrode to the cathode electrode and to be fully non-conductive upon flow of current into the control electrode from the cathode electrode, said load connected in the anode-cathode circuit of said device and to said current source resistance means connected between the cathode electrode of said device and said source of current, a source of control voltage operatively connected to the control electrode of said device, and reactance means connected in the control-cathode circuit of said device to delay the flow of current from said control electrode to said cathode electrode when said device is non-conductive and to delay the flow of current to said control electrode from said cathode electrode when said device is conductive, at least one of said resistance means, reactance means, and source of control voltage being variable to thereby control the duty cycle and the frequency of the chopped current through the load and hence the average current through the load.

3. A self-excited current chopper for interrupting the flow of current from a current source through a load with a controlled duty cycle comprising, a controllable rectifying device of the type having anode, cathode and control electrodes and capable of being caused to be fully conductive upon flow of current from the control electrode to the cathode electrode and to be fully non-conductive upon flow of current into the control electrode from the cathode electrode, said load connected in the anode-cathode circuit of said device and to said current source resistance means connected between the cathode electrode of said device and said source of current, a source of control voltage operatively connected to the control electrode of said device, and capacitive reactance means connected in parallel with said resistance means to delay the flow of current from said control electrode to said cathode electrode when said device is non-conductive and to delay the flow of current to said control electrode from said cathode electrode when said device is conductive, at least one of said resistance means, reactance means, and source of control voltage being variable to thereby control the duty cycle and the frequency of the chopped current through the load and hence the average current through the load.

4. A self-excited current chopper for interrupting the flow of current from a current source through a load with a controlled duty cycle comprising, a pair of input terminals connected across said source of current, a controllable rectifying device of the type having anode, cathode and control electrodes and capable of being caused to be fully conductive upon flow of current from the control electrode to the cathode electrode and to be fully non-conductive upon flow of current into the control electrode from the cathode electrode, said load being connected between one of said input terminals and the anode electrode of said device, resistance means connected between the other of said pair of input terminals and the cathode electrode of said device, a source of control voltage, and inductive reactance means connected between said source of control voltage and the control electrode of said device to delay the flow of current from said control electrode to said cathode electrode when said device is non-conductive and to delay the flow of current to said control electrode from said cathode electrode when said device is conductive, at least one of said resistance means, reactance means, and source of control voltage being variable to thereby control the duty cycle and the frequency of the chopped current through the load and hence the average current through the load.

References Cited by the Examiner

UNITED STATES PATENTS

| 2,996,641 | 8/1961 | Paynter | 331—108 XR |
| 3,097,335 | 7/1963 | Schmidt | 307—88.5 |
| 3,206,696 | 9/1965 | Wright | 331—111 X |

OTHER REFERENCES

German printed specification 1,103,389, Hoffman et al., March 30, 1961.

Grafham: "PNPN Switches With Gate Turn-Off Control," General Electric Application Note. No. 200.23, May 1962, pages 6–8.

ROY LAKE, *Primary Examiner.*

JOHN KOMINSKI, S. H. GRIMM, *Assistant Examiners.*